United States Patent
Philipp et al.

(10) Patent No.: US 12,403,957 B2
(45) Date of Patent: Sep. 2, 2025

(54) ADAPTIVE DRIVER LANE KEEPING ASSIST CONTROL

(71) Applicant: GM GLOBAL TECHNOLOGY OPERATIONS LLC, Detroit, MI (US)

(72) Inventors: Tzvi Philipp, Bet Shemesh (IL); Yael Shmueli Friedland, Tel Aviv (IL); Asaf Degani, Tel Aviv (IL); Igal Kotzer, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 18/451,278

(22) Filed: Aug. 17, 2023

(65) Prior Publication Data

US 2025/0058830 A1    Feb. 20, 2025

(51) Int. Cl.
*B62D 15/02*    (2006.01)
*B60Q 1/34*    (2006.01)
(Continued)

(52) U.S. Cl.
CPC ............ *B62D 15/025* (2013.01); *B60Q 1/346* (2013.01); *B62D 6/00* (2013.01); *G06N 3/08* (2013.01);
(Continued)

(58) Field of Classification Search
CPC ........ B62D 15/025; B62D 6/00; B60Q 1/346; G06N 3/08; G08G 1/167; B60W 30/12;
(Continued)

(56) References Cited

U.S. PATENT DOCUMENTS 10,766,496 B2 *   9/2020   Schacher ............... B60W 40/09
11,305,776 B2 *   4/2022   Beiderbeck ........... B60W 40/09
(Continued)

FOREIGN PATENT DOCUMENTS

DE    102004048010 A1    4/2006
DE    102009034096 A1    9/2010
(Continued)

OTHER PUBLICATIONS

Machine Translation of DE 102017130239 A1 PDF File Name: "DE102017130239A1_Machine_Translation.pdf" (Year: 2018).*
(Continued)

*Primary Examiner* — Lindsay M Low
*Assistant Examiner* — Ruben Picon-Feliciano

(57) ABSTRACT

A system includes a neural network module, a lane keeping assist (LKA) module, and a control module. The neural network module is configured to receive driver data, identify the driver, receive non-driver data, and generate a lane assist offset value specific to the identified driver based on the non-driver data and the driver data. The LKA module is configured to receive the lane assist offset value, receive vehicle data associated with one or more parameters of the vehicle while the vehicle is moving, the one or more parameters including a steering angle, a velocity, and a vehicle position between lane markings, and generate a steering angle control signal based on the received lane assist offset value and vehicle data. The control module is
(Continued)

configured to control steering of the vehicle based on the generated steering angle control signal. Other example systems and methods are also disclosed.

20 Claims, 5 Drawing Sheets

(51) Int. Cl.
  *B60W 30/12* (2020.01)
  *B62D 6/00* (2006.01)
  *G06N 3/08* (2023.01)
  *G08G 1/16* (2006.01)
(52) U.S. Cl.
  CPC ............ *G08G 1/167* (2013.01); *B60W 30/12* (2013.01); *B60W 2520/10* (2013.01); *B60W 2540/18* (2013.01); *B60W 2540/30* (2013.01); *B60W 2552/53* (2020.02); *B60W 2555/60* (2020.02); *B60W 2556/40* (2020.02); *B60W 2710/20* (2013.01)
(58) Field of Classification Search
  CPC ......... B60W 2520/10; B60W 2540/18; B60W 2540/30; B60W 2552/53; B60W 2555/60; B60W 2556/40; B60W 2710/20
  See application file for complete search history.

(56) References Cited

U.S. PATENT DOCUMENTS

| | | | |
|---|---|---|---|
| 2019/0291728 A1* | 9/2019 | Shalev-Shwartz | B60W 10/20 |
| 2020/0225676 A1* | 7/2020 | Telpaz | B60W 50/0098 |
| 2021/0312725 A1* | 10/2021 | Milton | G07C 5/008 |
| 2023/0294683 A1* | 9/2023 | Newman | G08G 1/167 |
| | | | 701/41 |
| 2023/0322208 A1* | 10/2023 | Rojas | B60W 60/0013 |
| | | | 701/41 |
| 2024/0362931 A1* | 10/2024 | Katz | G06V 40/20 |

FOREIGN PATENT DOCUMENTS

| | | | | |
|---|---|---|---|---|
| DE | 102017130239 A1 * | 6/2018 | ............ | B60T 7/085 |
| DE | 102017210410 A1 | 12/2018 | | |
| DE | 102022200935 A1 | 7/2023 | | |

OTHER PUBLICATIONS

Office Action dated Apr. 4, 2024 from German Patent Office for German Patent No. 102023133307.0; 7pgs.

* cited by examiner

ADAPTIVE DRIVER LANE KEEPING ASSIST CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to adaptive driver lane keeping assist control.

A vehicle may include a driver assistance system that relies on sensors for blind spot detection, adaptive cruise control, lane departure warnings, etc. In some cases, the driver assistance system may be a lane keeping assist (LKA) system. When the LKA system is employed, the system attempts to recenter the vehicle between the lanes when vehicle drift is detected using a corrective steering angle. Such correction is based on a predetermined lane offset value (e.g., a predefined distance that the vehicle should maintain from a lane marking), a longitudinal velocity of the vehicle, steering angle of the vehicle, and a current lane position of the vehicle between the lane markings.

SUMMARY

A system for controlling an adaptive lane keeping assist in a moving vehicle is disclosed. The system includes a neural network module, a lane keeping assist (LKA) module in communicate with the neural network module, and a control module in communicate with the LKA module. The neural network module is configured to receive driver data from one or more sensors in the vehicle, the driver data specific to a driving style of a driver while controlling the vehicle, identify the driver from a plurality of drivers associated with the vehicle, receive non-driver data indicative of environment parameters external to the vehicle while the vehicle is moving, and generate a lane assist offset value specific to the identified driver based on the non-driver data and the driver data. The LKA module is configured to receive the lane assist offset value specific to the identified driver, receive vehicle data associated with one or more parameters of the vehicle while the vehicle is moving, the one or more parameters including a steering angle, a velocity, and a vehicle position between lane markings, and generate a steering angle control signal based on the received lane assist offset value and vehicle data. The control module is configured to control steering of the vehicle based on the generated steering angle control signal.

In other features, the driver data and the non-driver data are a first set of data, and the neural network module is configured t receive a second set of data including driver data from one or more sensors in the vehicle specific to driving styles of the plurality of drivers associated with the vehicle, non-driver data indicative of environment parameters external to the vehicle while the vehicle is moving, and vehicle data associated with the one or more parameters of the vehicle while the vehicle is moving, and train, for each driver of the plurality of drivers associated with the vehicle, one or more models of the neural network module based on the received second set of data.

In other features, the LKA module is disabled when the one or more models of the neural network module are being trained.

In other features, the steering angle control signal is a first steering angle control signal, and the control module is configured to receive a second steering angle control signal from a steering wheel angle sensor and control steering of the vehicle based on the received second steering angle control signal when the one or more models of the neural network module are being trained.

In other features, the control module is configured to automatically activate a turn signal of the vehicle if the vehicle position is less than a defined distance from one of the lane markings.

In other features, the non-driver data includes at least one of perception data from one or more detection modules of the vehicle, mapping data, and traffic sign detection data.

In other features, the system further includes the one or more sensors configured to detect the driver data. The one or more sensors include one or more pressure sensors installed on a steering wheel of the vehicle and configured to detect an applied pressure, and the neural network module is configured to detect a level of driver engagement based on the applied pressure, and generate the lane assist offset value if the level of driver engagement is below a threshold.

In other features, the neural network module is configured to determine an amount of driver interaction with the vehicle based on the received driver data from the one or more sensors in the vehicle, and reduce a magnitude of the vehicle data provided to the LKA module if the amount of driver interaction is above a threshold.

In other features, the neural network module is configured to identify the driver from the plurality of drivers associated with the vehicle based on the received driver data specific to the driving style of the driver.

A method for controlling an adaptive lane keeping assist in a moving vehicle is disclosed. The method includes receiving driver data from one or more sensors in the vehicle, the driver data specific to a driving style of a driver while controlling the vehicle, identifying, with a neural network module, the driver from a plurality of drivers associated with the vehicle, receiving non-driver data indicative of environment parameters external to the vehicle while the vehicle is moving, generating a lane assist offset value specific to the identified driver based on the non-driver data and the driver data, receiving vehicle data associated with one or more parameters of the vehicle while the vehicle is moving, the one or more parameters including a steering angle, a velocity, and a vehicle position between lane markings, generating, with a LKA module, a steering angle control signal based on the lane assist offset value and the vehicle data, and controlling steering of the vehicle based on the generated steering angle control signal.

In other features, the driver data and the non-driver data are a first set of data, and the method further includes receiving a second set of data including driver data from one or more sensors in the vehicle specific to driving styles of the plurality of drivers associated with the vehicle, non-driver data indicative of environment parameters external to the vehicle while the vehicle is moving, and vehicle data associated with the one or more parameters of the vehicle while the vehicle is moving, and training, for each driver of the plurality of drivers associated with the vehicle, one or more models of the neural network module based on the received second set of data.

In other features, the method further includes disabling the LKA module when the one or more models of the neural network module are being trained.

In other features, the steering angle control signal is a first steering angle control signal, and the method further includes receiving a second steering angle control signal from a steering wheel angle sensor and controlling steering of the vehicle based on the received second steering angle control signal when the one or more models of the neural network module are being trained.

In other features, the non-driver data includes at least one of perception data from one or more detection modules of the vehicle, mapping data, and traffic sign detection data.

In other features, the method further includes automatically activating a turn signal of the vehicle if the vehicle position is less than a defined distance from one of the lane markings.

In other features, receiving the driver data from the one or more sensors in the vehicle includes receiving an applied pressure from one or more pressure sensors installed on a steering wheel of the vehicle.

In other features, the method further includes detecting a level of driver engagement based on the applied pressure, and generating the lane assist offset value if the level of driver engagement is below a threshold.

In other features, the method further includes determining an amount of driver interaction with the vehicle based on the received driver data from the one or more sensors in the vehicle, and reducing a magnitude of the vehicle data provided to the LKA module if the amount of driver interaction is above a threshold.

In other features, identifying, with the neural network module, the driver from the plurality of drivers associated with the vehicle includes identifying the driver based on the received driver data specific to the driving style of the driver.

A system for controlling an adaptive lane keeping assist in a moving vehicle is disclosed. The system includes a neural network module and a LKA module in communicate with the neural network module. The neural network module is configured to receive a first set of data including driver data from one or more sensors in the vehicle specific to driving styles of a plurality of drivers associated with the vehicle, non-driver data indicative of environment parameters external to the vehicle while the vehicle is moving, and vehicle data associated with the one or more parameters of the vehicle while the vehicle is moving, train, for each driver of the plurality of drivers associated with the vehicle, one or more models of the neural network module based on the received second set of data, after the one or more models of the neural network module are trained, receive a second set of including driver data from the one or more sensors specific to a driving style of a driver of the plurality of drivers and non-driver data indicative of environment parameters external to the vehicle while the vehicle is moving, identify the driver from the plurality of drivers associated with the vehicle based on the driving style of the driver, and generate a lane assist offset value specific to the identified driver based on the non-driver data and the driver data. The LKA module is configured to receive vehicle data associated with one or more parameters of the vehicle while the vehicle is moving, the one or more parameters including a steering angle, a velocity, and a vehicle position between lane markings, and generate a steering angle control signal based on the lane assist offset value and the vehicle data to control steering of the vehicle.

In other features, the LKA module is disabled when the one or more models of the neural network module are being trained.

In other features, the steering angle control signal is a first steering angle control signal, and the system further includes a control module configured to receive a second steering angle control signal from a steering wheel angle sensor, and control steering of the vehicle based on the received second steering angle control signal when the one or more models of the neural network module are being trained.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may employ a lane keeping assist (LKA) system for adaptive driving functions. The LKA system recognizes a current position of the vehicle between lane markings and then attempts to recenter the vehicle between the lanes when vehicle drift is detected. The amount of correction used to recenter the vehicle is proportional to an error detected (e.g., a difference between the current position of the vehicle and a threshold). In such scenarios, the LKA system generally overcorrects and creates, for the vehicle passengers and driver, unpleasant motion sensations (e.g., jerky corrective movements of the vehicle) due to over correction feedback. Due to such unpleasant motion sensations, some experienced drivers may choose to override the corrective function of the LKA system.

In addition, the actual correction initiated by the LKA system may seem to be too extreme or too small for the given situation for experienced drivers. This could generate for the vehicle driver and passengers an insecure sense of control and uneasiness of the behavior and/or safety of the vehicle. Instead of instilling confidence in the vehicle performance, the driver may feel as if they are in "battle" with the LKA system. Such scenarios may be especially pronounced on curvy mountainous roads where the changes in elevation besides the turns can greatly alter the acceleration and overall performance of the vehicle.

The systems and methods according to the present disclosure provide solutions for LKA adaptation for a specific driver based on that driver's behavior and learned correction techniques. For example, the systems and methods enable the training of a neural network module based on collected driver data specific to a driving style of the driver, vehicle data from when the driver is controlling the vehicle, and non-driver based environmental dependent parameters, such as road geometry, weather, surrounding traffic, obstacles, etc. Such training may be provided for multiple drivers associated with the same vehicle and when a LKA module is disabled. Once trained to particular preferences of drivers, the neural network module provides an adaptive lane assist offset value to the LKA module for a specific, identified driver, thereby enabling the LKA module to generate a steering angle control signal for controlling steering of the vehicle while being driven by the driver. As a result, a more user friendly and smoother experience is provided as compared to conventional LKA systems, thereby increasing LKA function usage in the vehicle.

Figure 1:
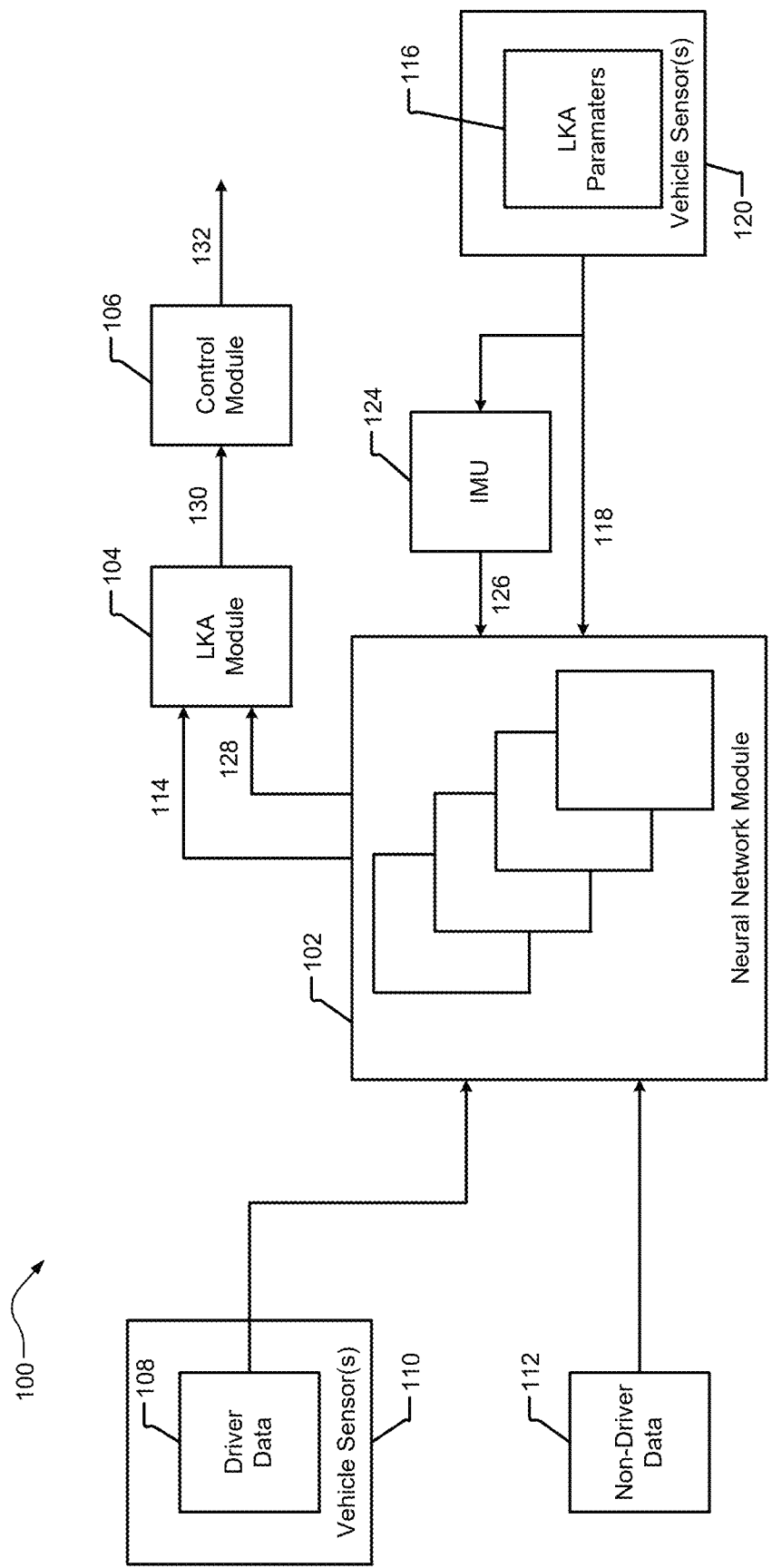
FIG. 1 is a block diagram of an example system for controlling an adaptive lane keeping assist in a moving vehicle according to the present disclosure.

Referring now to FIG. 1, a block diagram of an example system 100 is presented for controlling an adaptive LKA in a moving vehicle. The system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the system 100 may be applicable to an autonomous vehicle, a semi-autonomous vehicle, etc.

As shown in FIG. 1, the system 100 generally includes a neural network module 102, a LKA module 104 in communicate with the neural network module 102, and a control module 106 in communicate with the LKA module. While the system 100 of FIG. 1 is shown as including multiple dedicated modules 102, 104, 106, it should be appreciated that some or all of the features provided by the modules 102, 104, 106 may be performed by one or more modules.

In various embodiment, the neural network module 102 of FIG. 1 may include various layers. For example, the neural network module (e.g., a deep neural network module, etc.) 102 may include one or more input layers, one or more hidden layers, and one or more output layers. The layers may include nodes, where each node connects to another and has a weight and threshold value. If an output of a node is above its threshold value, that node may be activated, sending data to the next layer.

The neural network module 102 includes trainable LKA correction models (e.g., LKA correction algorithms). In such examples, the models may be trained in conventional manners by relying on training data as further explained below to learn and improve their accuracy over time. In the example of FIG. 1, the neural network module 102 is shown as a trained module which provides an adaptive lane assist offset value as further explained below.

As shown in FIG. 1, the trained neural network module 102 receives data from multiple sources. For example, the neural network module 102 receives driver data 108 specific to a driving style of a driver while controlling the vehicle. In such examples, the driver data 108 may be sensed by one or more sensors 110 in the vehicle. For instance, in some examples, the one or more sensors 110 may be installed on (e.g., embedded in, attached to, etc.) one or more components of a steering wheel assembly.

Figure 3:
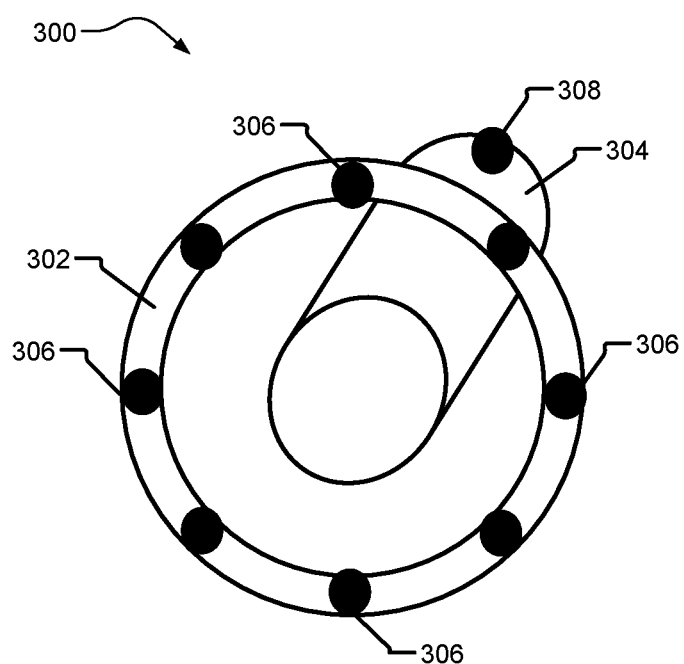
FIG. 3 is a block diagram of an example steering wheel assembly including sensors for collecting driver data according to the present disclosure.

For example, FIG. 3 depicts an example steering wheel assembly 300 including a steering wheel 302 and a steering wheel shaft 304 connected to the steering wheel 302. As shown in FIG. 3, multiple sensors 306, 308 are installed on the steering wheel 302 and the steering wheel shaft 304.

In the example of FIG. 3, the sensors 306 are pressure sensors installed around the circumference of the steering wheel 302. The pressure sensors 306 detect a pressure as applied by a driver during the course of driving (e.g., when the driver grips the steering wheel 302). In other words, the pressure sensors 306 measure the grip strength of the driver. The collected pressure data may then be used to determine a level of driver engagement, as further explained below. Additionally, and as shown in FIG. 3, the sensor 308 is installed on the steering wheel shaft 304. The sensor 308 may include, for example, an accelerometer, a steering wheel angle sensor, a torque sensor, etc. for collecting driver specific data (e.g., the amount of applied torque, the rotational angle of the steering wheel, etc.) when the driver manipulates the steering wheel 302 (and therefore the steering wheel shaft 304). While the steering wheel assembly 300 of FIG. 3 is shown as including eight pressure sensors 306 and one sensor 308, it should be appreciated that the steering wheel assembly 300 may include more or less sensors and/or sensors having different functionalities. Regardless, the sensors 306, 308 collect data (e.g., the driver data 108 of FIG. 1) specific to a driving style of a driver and provide the data to the neural network module 102.

With continued reference to FIG. 1, the neural network module 102 additionally receives non-driver data 112 indicative of environment parameters external to the vehicle while the vehicle is moving. For example, the non-driver data 112 may include perception data from one or more detection modules (e.g., cameras, radars, lidars, etc.) of the vehicle, mapping data, traffic sign detection data, etc. In various embodiments, the perception data may include, for example, the road geometry, the weather, surrounding traffic, obstacles, etc. that may be detected by a front camera module and/or another suitable detection module.

In various embodiments, the neural network module 102 identifies the particular driver of the vehicle. In such examples, the driver may be identified out of multiple drivers associated with the vehicle. For example, and as further explained below, the neural network module 102 is trainable for multiple drivers associated with the vehicle. In such examples, the neural network module 102 may identify the particular driver of the vehicle from a potential database of associated drivers based on, for example, the received driver data 108 specific to the driving style of the driver. In other examples, the neural network module 102 may identify the particular driver based on other data, such as programmed presets (e.g., a driver seat placement, a side mirror placement, a rearview mirror placement, a selectable input, etc.), a selected input, etc.

Additionally, the neural network module 102 generates a lane assist offset value specific to the identified driver. In such examples, the lane assist offset value may be generated based on the driver data 108 and the non-driver data 112 received by the neural network module 102. In various embodiments, the lane assist offset value is an adaptive value to better modulate a corrective action and provide a more pleasant driving experience. For example, the lane assist offset value may vary depending on the identified driver, the driving style of the driver, and/or how the driver reacts in different geographic locations, conditions, scenarios, etc. (e.g., as detected by the one or more detection modules, etc.). Once generated, the neural network module 102 may transmit an output signal 114 including the lane assist offset value or a representation thereof to the LKA module 104.

In various embodiments, the neural network module 102 may additionally receive LKA parameters 116 (e.g., vehicle data) via one or more input signals 118. In such examples, the LKA parameters 116 may include, for example, a longitudinal velocity of the vehicle, a steering angle of the vehicle, and a current lane position of the vehicle between lane markings collected by one or more vehicle sensors 120, such as a steering wheel angle sensor, a front camera module, a velocity sensor, etc. In some examples, an inertial measurement unit (IMU) or module 124 may receive the steering angle of the vehicle (or a representation thereof) and provide data (via an input signal 126) to the neural network module 102 based on the steering angle. In such examples, the data provided by the IMU 124 may be indicative of a direction the vehicle is traveling.

In some examples, the LKA parameters 116 or modified LKA parameters may be provided to the LKA module 104 via one or more signals 128. For example, the trained neural network module 102 may analyze the LKA parameters 116 and adjust one or more of the LKA parameters (if necessary) based on expected forward-looking driving conditions and/or particular driving behaviors of the identified driver. For instance, one or more of the LKA parameters 116 may be adjusted based on the real-time detection (e.g., via perception) of other vehicles, bicycles, sign recognition, road conditions, the weather (e.g., cross winds, rain, ice, snow, etc.), based on maps of the region, etc.

Then, the LKA module 104 may generate a steering angle control signal 130 based on the lane assist offset value and the LKA parameters from the neural network module 102. In various embodiments, the LKA module 104 may function in a conventional manner based on the received lane assist offset value and the LKA parameters (e.g., modified or unmodified LKA parameters). For example, the LKA module 104 may utilize the adaptive lane assist offset value and the LKA parameters to determine a corrective steering angle.

Once the corrective steering angle is determined, the LKA module 104 transmits the steering angle control signal 130 with the corrective steering angle (or a representation thereof) to the control module 106 and/or another control module (e.g., a steering control module) in the vehicle. The control module 106 (or the steering control module) then controls steering of the vehicle based on the generated steering angle control signal 130. For example, the control module 106 may control vehicle steering via an electronic power steering (EPS) motor based on the generated signal 130 and/or via another suitable type of steering system. In such examples, the control module 106 may provide a control signal 132 to the EPS motor and/or another steering system, as shown in FIG. 1.

In various embodiments, lane turn signals of the vehicle may be automatically triggered when evasive maneuvers are caused by the LKA module 104. For example, the control module 106 may automatically activate a turn signal of the vehicle if the vehicle position is less than a defined distance from one of the lane markings (e.g., due to an evasive steering maneuver caused by the LKA module 104). In such examples, the left turn signal may be activated if the evasive steering maneuver causes the vehicle to veer to the left and possibly near the left lane marking, and the right turn signal may be activated if the evasive steering maneuver causes the vehicle to veer to the right and possibly near the right lane marking. As a result, drivers of neighboring and/or oncoming vehicles may be provided a warning of movement of the vehicle.

In various embodiments, the system 100 may take into account driver engagement and/or interaction with respect to the amount of intervention the LKA module 104 should apply. For example, in some embodiments, the neural network module 102 (and/or another suitable module) may detect or otherwise determine a level of driver engagement based on a pressure applied by the driver (as provided in the driver data 108) while driving. In such examples, the applied pressure may be detected by the pressure sensors 306 of FIG. 3. Then, the neural network module 102 may generate or adjust the lane assist offset value if the level of driver engagement is below a threshold. For example, the neural network module 102 may correlate an engagement value to the detected pressure as applied by a particular driver driving with/at particular conditions (road conditions, vehicle conditions, etc.), and then compare that engagement value to a defined threshold. If the engagement value is below the defined threshold (e.g., indicating a low amount of driver engagement), the neural network module 102 may generate or increase the lane assist offset value. If, however, the engagement value is above the defined threshold (e.g., indicating a high amount of driver engagement), the neural network module 102 may not generate or reduce the lane assist offset value.

Additionally, in some embodiments, the neural network module 102 (and/or another suitable module) may detect or otherwise determine an amount of driver interaction with the vehicle based on the received driver data 108. Then, the neural network module 102 may adjust a magnitude of the vehicle data (e.g., the LKA parameters) provided to the LKA module 104 based on the amount of driver interaction to change the amount of intervention the LKA module 104 should apply. For example, the neural network module 102 may determine an amount of driver interaction with the vehicle based on data (e.g., an applied torque, a rotational angle of the steering wheel, an acceleration of a turning steering wheel, etc.) from the sensor 308 of FIG. 3. In such examples, the neural network module 102 may determine a driver interaction value based on the received data due to actions of a particular driver driving with/at particular conditions (road conditions, vehicle conditions, etc.), and then compare the driver interaction value to a defined threshold. If the driver interaction value is below the defined threshold (e.g., indicating a low amount of interaction), the neural network module 102 may increase the magnitude of the vehicle data (e.g., the LKA parameters) provided to the LKA module 104. If, however, the driver interaction value is above the defined threshold (e.g., indicating a high amount of interaction), the neural network module 102 may reduce the magnitude of the vehicle data provided to the LKA module 104.

As explained herein, the neural network module 102 of FIG. 1 generates an adaptive lane assist offset value for a particular driver driving with/at particular conditions (road conditions, vehicle conditions, etc.). Before the neural network module 102 is able to accurately generate and provide the adaptive lane assist offset value to the LKA module 104, one or more LKA correction algorithms (e.g., machine learning models) in the neural network module 102 are trained.

Figure 2:
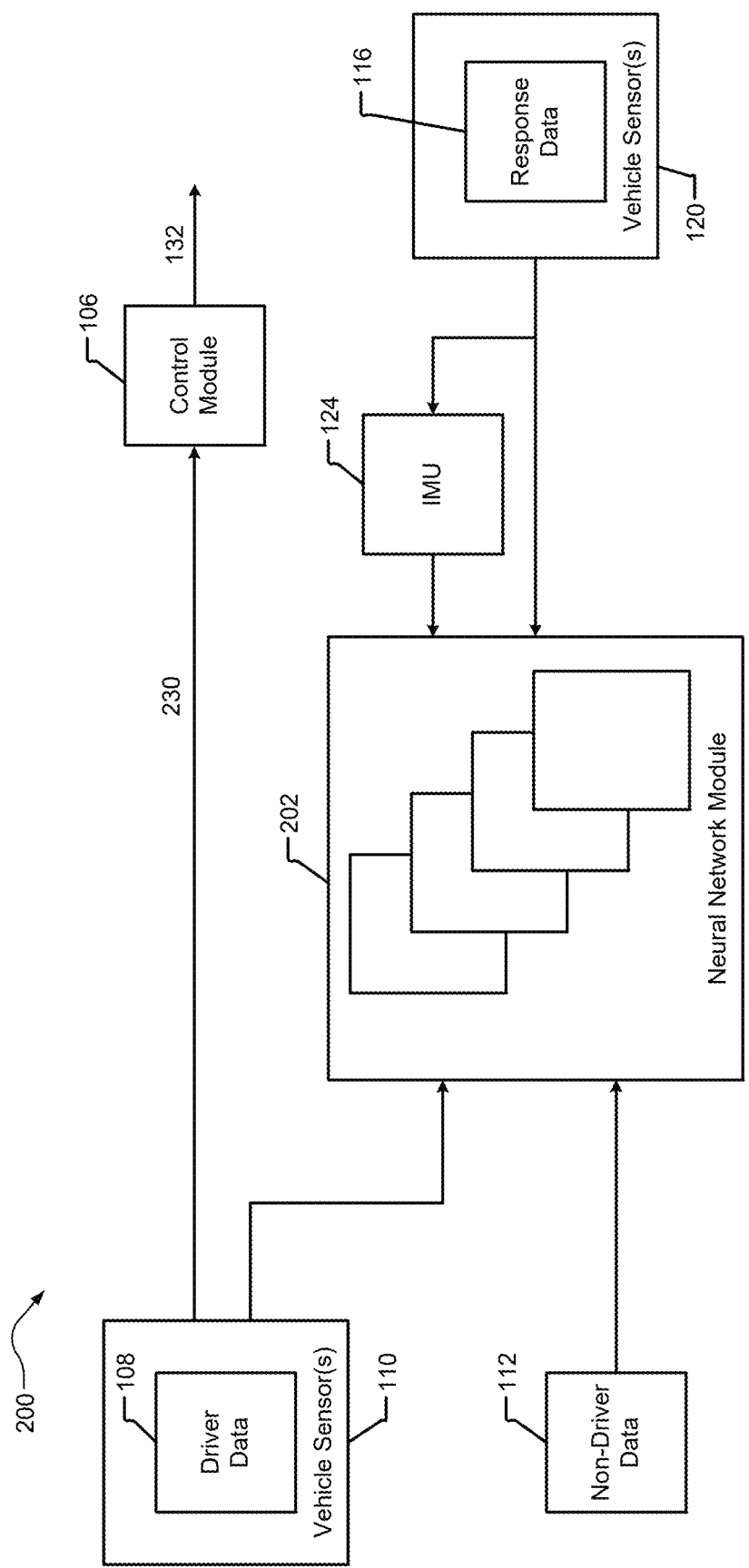
FIG. 2 is a block diagram of an example system for training a neural network module to generate adaptive lane assist offset values for drivers according to the present disclosure.

For example, FIG. 2 depicts a block diagram of a system 200 for training a neural network module before it is used to generate adaptive lane assist offset values for drivers. The system 200 of FIG. 2 is similar to the system 100 of FIG. 1 but includes different module interactions as further explained below. In some examples, the systems 100, 200 of FIGS. 1-2 may be considered the same system (and employable in the same vehicle), with the system 200 being employed to train a neural network module and the system 100 being employed to utilize the trained neural network module to generate an adaptive lane assist offset value for a particular driver driving with/at particular conditions (road conditions, vehicle conditions, etc.).

As shown in FIG. 2, the system 200 generally includes a neural network module 202 and the control module 106 of FIG. 1. In the example of FIG. 2, the neural network module 202 is the same as the neural network module 102 of FIG.

1. However, the neural network module 202 is in a training state whereas the neural network module 102 of FIG. 1 is in a trained state.

In the example of FIG. 2, the neural network module 202 is trainable based on data received from multiple sources. For example, and as shown in FIG. 2, the neural network module 202 receives the driver data 108 specific to a driving style of a driver while controlling the vehicle. Such driver data 108 may be obtained by the vehicle sensor(s) 110 of FIG. 1 and/or the sensors 306, 308 of FIG. 3. Additionally, the neural network module 202 receives the non-driver data 112 of FIG. 1 indicative of environment parameters external to the vehicle while the vehicle is moving, as explained above. Further, the neural network module 202 receives the LKA parameters 116 (e.g., the vehicle data) and data from the IMU 124, as explained above relative to FIG. 1. In such examples, the LKA parameters 116 include, for example, the longitudinal velocity of the vehicle, the steering angle of the vehicle, and the current lane position of the vehicle between lane markings collected by the vehicle sensor(s) 120, as explained above.

Then, the neural network module 202 trains one or more LKA correction algorithms (e.g., machine learning models) based on the received data. In such examples, the one or more LKA correction algorithms may be individually trained for multiple drivers associated with the vehicle. For example, a driver may select an input and/or otherwise notify the system 200 that the driver is currently driving the vehicle. In this manner, the neural network module 202 can distinguish between different drivers that use the vehicle. Such training may be accomplished through conventional manners by relying on the received training data. As such, the neural network module 202 is trainable for each particular driver and according to the driving style of that driver driving with/at particular conditions (road conditions, vehicle conditions, etc.). This allows the LKA correction algorithm(s) to be trained to recognize driver correction patterns regarding lane position.

In various embodiments, the neural network module 202 may be trained over a period of time. For example, the neural network module 202 can be adequately trained in the first few months of vehicle ownership, depending on the actual usage of the vehicle. Additionally, the system 200 can be reset and retrained if desired. For example, if the vehicle with a trained neural network module is sold and/or alternate drivers are using the vehicle, driver data can be removed and values can be reset to default values.

In the example of FIG. 2, the system 200 is shown as not including a LKA module, such as the LKA module 104 of FIG. 1. This is because the LKA module is disabled when the LKA correction algorithm(s) of the neural network module 202 are being trained. In other words, the LKA module is not utilized during the training process. While FIG. 1 does not show the LKA module, it should be appreciated that the system 200 may include a LKA module (e.g., the LKA module 104 of FIG. 1) that is disabled and connected with other modules (e.g., the control module 106, etc.). In such examples, the LKA module may include an input pin for disabling the module.

In various embodiments, the control module 106 and/or another control module (e.g., a steering control module) in the vehicle controls steering of the vehicle based on a steering angle control signal 230 when the LKA correction algorithm(s) of the neural network module 202 are being trained. For example, because the LKA module is disabled during training, a steering angle control signal cannot be generated by the module for controlling steering of the voice. As such, during training, a steering wheel angle sensor (e.g., one of the sensors 110) monitors a rotational position, movement, etc. of a steering wheel and generates the steering angle control signal 230 based on the position, movement, etc. of the steering wheel. Then, the steering wheel angle sensor transmits the steering angle control signal 230 to the control module 106, which in turn controls steering of the vehicle based on the steering angle control signal 230.

Figure 4:
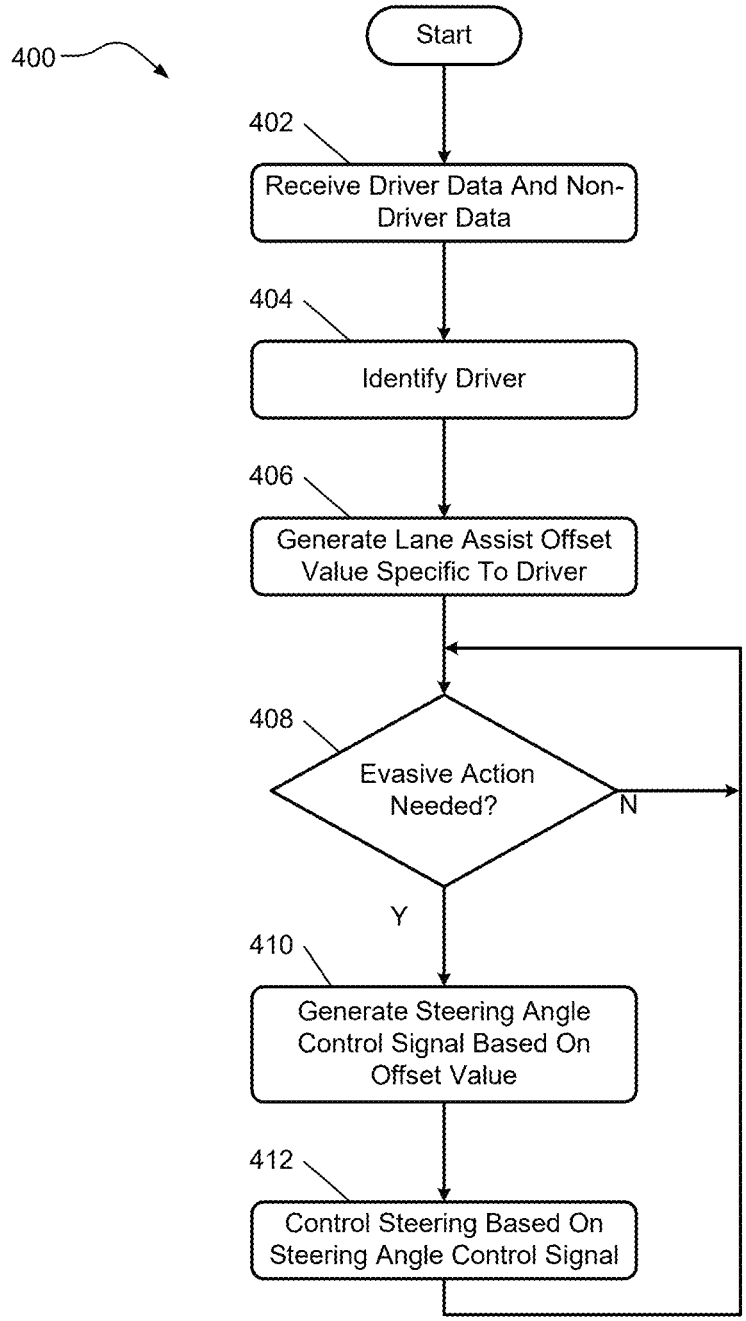
FIG. 4 is a flowchart of an example control process for controlling an adaptive lane keeping assist in a moving vehicle according to the present disclosure.

FIG. 4 illustrates an example control process 400 employable by the neural network module 102, the LKA module 104, and the control module 106 of FIG. 1 for controlling an adaptive LKA in a moving vehicle. Although the example control process 400 is described in relation to the system 100 of FIG. 1, the control process 400 may be employable by any suitable system. In the example of FIG. 4, the control process 400 may start when the system 100, the vehicle, etc. is powered-on and/or at another suitable time.

As shown in FIG. 4, control begins at 402 where the trained neural network module 102 receives data from different sources. For example, the trained neural network module 102 receives driver data, non-driver data, LKA parameters and/or IMU data, as explained above relative to FIG. 1. Such data provides information about the driving style of the driver, vehicle data from when the driver is controlling the vehicle, and non-driver based environmental dependent parameters, such as road geometry, weather, surrounding traffic, obstacles, etc. at time the driver is controlling the vehicle. Control then proceeds to 404.

At 404, control identifies the particular driver of the vehicle. For example, and as explained above, the trained neural network module 102 and/or another suitable module may identify the particular driver from a potential database of associated drivers based on the driver data specific to the driving style of the driver. In other examples, the trained neural network module 102 and/or another suitable module may identify the particular driver based on programmed presets, an selected input, etc. as explained above. Control then proceeds to 406.

At 406, the trained neural network module 102 generates an adaptive lane assist offset value specific to the identified driver. For example, the lane assist offset value may be generated based on the driver data, the non-driver data, the LKA parameters and/or the IMU data received at 402. In such examples, the adaptive lane assist offset value may vary depending on the identified driver, the driving style of the driver and/or how the driver reacts in different geographic locations, conditions, scenarios, etc. (e.g., as detected by the one or more detection modules, etc.). Control then proceeds to 408.

At 408, control determines whether an evasive action is needed. For example, the LKA module 104 may consider the adaptive lane assist offset value along with other data, such as the LKA parameters (or adjusted LKA parameters as explained herein). If the LKA module 104 determines that the vehicle is drifting beyond the adaptive lane assist offset value (e.g., a threshold) based on the LKA parameters (or adjusted LKA parameters) and an evasive action is needed, control continues to 410. If, however, the LKA module 104 determines that the vehicle is not drifting beyond the adaptive lane assist offset value based on the LKA parameters (or adjusted LKA parameters) and an evasive action is not needed, control may return to 408 as shown in FIG. 4 or another suitable step such as 402.

At 410, control generates a steering angle control signal based on the lane assist offset value. For example, and as explained above, the LKA module 104 may generate a steering angle control signal based on the adaptive lane assist offset value (e.g., received from the trained neural network module 102) and the LKA parameters (or adjusted LKA parameters as explained herein). The LKA module 104 may then transmit the generated steering angle control signal to the control module 106. Control then proceeds to 412.

At 412, the control module 106 controls steering of the vehicle based on the generated steering angle control signal. For example, the control module 106 may control vehicle steering via an EPS motor based on the generated signal and/or in another suitable type of steering system, as explained above. Control may then return to 408 as shown in FIG. 4 or another suitable step such as 402.

Figure 5:
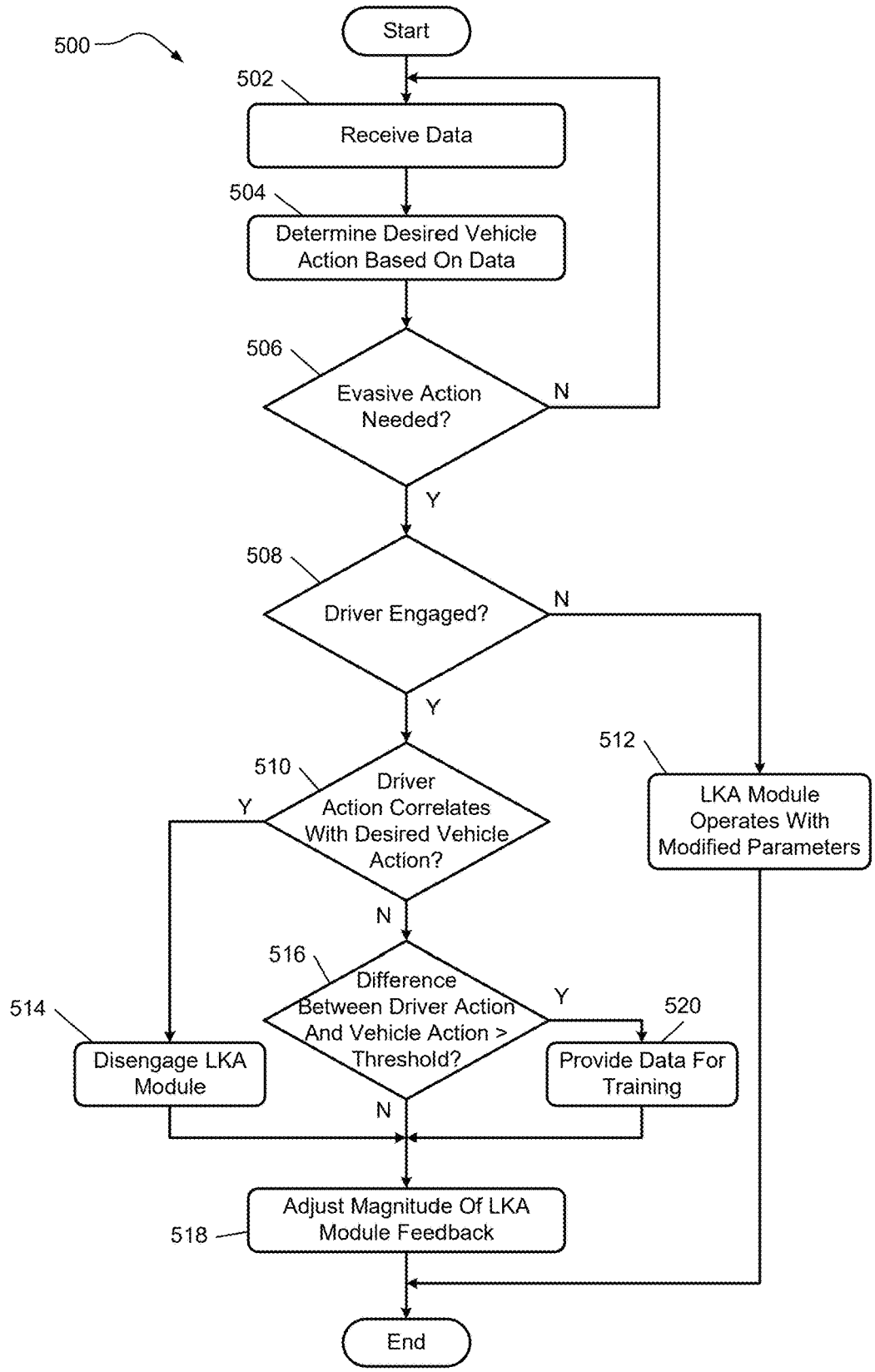
FIG. 5 is a flowchart of another example control process for controlling an adaptive lane keeping assist in a moving vehicle according to the present disclosure.

FIG. 5 illustrates an example control process 500 employable by the neural network module 102, the LKA module 104, and the control module 106 of FIG. 1 for controlling an adaptive LKA in a moving vehicle. Although the example control process 500 is described in relation to the system 100 of FIG. 1, the control process 500 may be employable by any suitable system. In the example of FIG. 5, the control process 500 may start when the system 100, the vehicle, etc. is powered-on and/or at another suitable time.

As shown in FIG. 5, control begins at 502 where the trained neural network module 102 receives driver data, non-driver data, LKA parameters and/or IMU data, as explained above relative to FIGS. 1 and 4. Control then proceeds to 504.

At 504, control determines a desired vehicle action based on the received data. For example, the trained neural network module 102 may generate a plan based on sensory input, such as the LKA parameters (or adjusted LKA parameters) and the IMU data. Control then proceeds to 506.

At 506, control determines whether an evasive action is needed. For example, and as explained above relative to FIG. 4, the LKA module 104 may consider a received adaptive lane assist offset value along with other data, such as the LKA parameters (or adjusted LKA parameters), as explained herein. If the LKA module 104 determines that an evasive action is needed (based on the adaptive lane assist offset value), control continues to 508. If not, control may return to 502 as shown in FIG. 5.

At 508, control determines whether the driver is engaged. For example, and as explained above, the neural network module 102 (and/or another suitable module) may determine a level of driver engagement based on a pressure applied by the driver to a steering wheel while driving. In such examples, the neural network module 102 may correlate an engagement value to the detected pressure and then compare that engagement value to a defined threshold. If the engagement value is above the defined threshold (e.g., indicating a high amount of driver engagement), the neural network module 102 may determine that the driver is engaged. In such scenarios, control proceeds to 510.

If, however, the engagement value is below the defined threshold (e.g., indicating a low amount of driver engagement), the neural network module 102 may determine that the driver is not engaged. Control then proceeds to 512 where the LKA module 104 operates based on the adaptive lane assist offset value along with other data, such as the LKA parameters (or adjusted LKA parameters), as explained herein. Control may then end as shown in FIG. 5 or return to another step, such as 502.

At 510, control determines whether actions of the driver correlate with the desired vehicle action. For example, and as explained above, the neural network module 102 (and/or another suitable module) may determine driver interactions based on the received driver data. If the actions of the driver correlate to the desired vehicle action (e.g., indicating the driver is manually attempting to recenter the vehicle between the lanes), control proceeds to 514 where the LKA module 104 is disengaged (e.g., at least temporarily disengaged). In such examples, the steering of the vehicle may be controlled based on a steering angle control signal generated by a steering wheel angle sensor as explained above. Control then proceeds to 518.

If, however, the actions of the driver do not correlate to the desired vehicle action at 510 (e.g., indicating the driver is not attempting to recenter the vehicle between the lanes or is taking undesirable actions), control proceeds to 516. At 516, control determines whether a difference between the actions of the driver and the desired vehicle action is greater than a threshold. For example, the neural network module 102 and/or the control module 106 may correlate a value for the driver's actions and another value for the desired vehicle action. If the difference between the driver's actions and the desired vehicle action (e.g., a difference between the values) is less than the threshold, control proceeds to 518. If, however, the difference between the driver's actions and the desired vehicle action is greater than the threshold, control proceeds to 520 where the received data at 502 is provided to the neural network module 102 for additional training. Control proceeds to 518.

At 518, control may adjust a magnitude of the LKA parameters (e.g., LKA module feedback) provided to the LKA module 104. For example, the neural network module 102 may reduce the magnitude of the LKA parameters. In turn, the LKA module 104 may adjust corrective actions to provide an improved user experience.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for controlling an adaptive lane keeping assist in a moving vehicle, the system comprising:
one or more sensors configured to detect driver data, the one or more sensors including one or more pressure sensors installed on a steering wheel of the vehicle and configured to detect an applied pressure;
a neural network controller configured to:
receive driver data from the one or more sensors in the vehicle, the driver data specific to a driving style of a driver while controlling the vehicle;
identify the driver from a plurality of drivers associated with the vehicle;
receive non-driver data indicative of environment parameters external to the vehicle while the vehicle is moving;
detect a level of driver engagement based on the applied pressure; and
in response to the level of driver engagement being below a threshold, generate a lane assist offset value specific to the identified driver based on the non-driver data and the driver data;
a lane keeping assist (LKA) controller in communication with the neural network controller, the LKA controller configured to:
receive the lane assist offset value specific to the identified driver;

receive vehicle data associated with one or more parameters of the vehicle while the vehicle is moving, the one or more parameters including a steering angle, a velocity, and a vehicle position between lane markings; and generate a steering angle control signal based on the received lane assist offset value and vehicle data; and a vehicle controller in communication with the LKA controller, the vehicle controller configured to control steering of the vehicle based on the generated steering angle control signal.

2. The system of claim 1, wherein:

the driver data and the non-driver data are a first set of data; and the neural network controller is configured to:

receive a second set of data including driver data from one or more sensors in the vehicle specific to driving styles of the plurality of drivers associated with the vehicle, non-driver data indicative of environment parameters external to the vehicle while the vehicle is moving, and vehicle data associated with the one or more parameters of the vehicle while the vehicle is moving; and train, for each driver of the plurality of drivers associated with the vehicle, one or more models of the neural network controller based on the received second set of data.

3. The system of claim 2, wherein the LKA controller is disabled when the one or more models of the neural network controller are being trained.

4. The system of claim 2, wherein:

the steering angle control signal is a first steering angle control signal; and the vehicle controller is configured to receive a second steering angle control signal from a steering wheel angle sensor and control steering of the vehicle based on the received second steering angle control signal when the one or more models of the neural network controller are being trained.

5. The system of claim 1, wherein the vehicle controller is configured to automatically activate a turn signal of the vehicle if the vehicle position is less than a defined distance from one of the lane markings.

6. The system of claim 1, wherein the non-driver data includes at least one of perception data, mapping data, and traffic sign detection data.

7. The system of claim 1, wherein the neural network controller is configured to determine an amount of driver interaction with the vehicle based on the received driver data from the one or more sensors in the vehicle, and reduce a magnitude of the vehicle data provided to the LKA controller if the amount of driver interaction is above a threshold.

8. The system of claim 1, wherein the neural network controller is configured to identify the driver from the plurality of drivers associated with the vehicle based on the received driver data specific to the driving style of the driver.

9. The system of claim 1, wherein the neural network controller is configured to identify the driver from a plurality of drivers associated with the vehicle based on a preset seat placement of the vehicle, a preset side mirror placement of the vehicle, or a preset rearview mirror placement of the vehicle.

10. A method for controlling an adaptive lane keeping assist in a moving vehicle having one or more sensors, the one or more sensors including one or more pressure sensors installed on a steering wheel of the vehicle, the method comprising:

receiving driver data from the one or more sensors in the vehicle, the driver data specific to a driving style of a driver while controlling the vehicle, the driver data including an applied pressure from the one or more pressure sensors;

identifying, with a neural network controller, the driver from a plurality of drivers associated with the vehicle;

detecting a level of driver engagement based on the applied pressure;

receiving non-driver data indicative of environment parameters external to the vehicle while the vehicle is moving;

in response to the level of driver engagement being below a threshold, generating a lane assist offset value specific to the identified driver based on the non-driver data and the driver data;

receiving vehicle data associated with one or more parameters of the vehicle while the vehicle is moving, the one or more parameters including a steering angle, a velocity, and a vehicle position between lane markings;

generating, with a lane keeping assist (LKA) controller, a steering angle control signal based on the lane assist offset value and the vehicle data; and controlling steering of the vehicle based on the generated steering angle control signal.

11. The method of claim 10, wherein:

the driver data and the non-driver data are a first set of data; and the method further comprises receiving a second set of data including driver data from one or more sensors in the vehicle specific to driving styles of the plurality of drivers associated with the vehicle, non-driver data indicative of environment parameters external to the vehicle while the vehicle is moving, and vehicle data associated with the one or more parameters of the vehicle while the vehicle is moving, and training, for each driver of the plurality of drivers associated with the vehicle, one or more models of the neural network controller based on the received second set of data.

12. The method of claim 11, further comprising disabling the LKA controller when the one or more models of the neural network controller are being trained.

13. The method of claim 12, wherein:

the steering angle control signal is a first steering angle control signal; and the method further comprises receiving a second steering angle control signal from a steering wheel angle sensor and controlling steering of the vehicle based on the received second steering angle control signal when the one or more models of the neural network controller are being trained.

14. The method of claim 13, wherein the non-driver data includes at least one of perception data, mapping data, and traffic sign detection data.

15. The method of claim 10, further comprising automatically activating a turn signal of the vehicle if the vehicle position is less than a defined distance from one of the lane markings.

16. The method of claim 10, further comprising determining an amount of driver interaction with the vehicle based on the received driver data from the one or more sensors in the vehicle, and reducing a magnitude of the vehicle data provided to the LKA controller if the amount of driver interaction is above a threshold.

17. The method of claim 10, wherein identifying, with the neural network controller, the driver from the plurality of drivers associated with the vehicle includes identifying the driver based on the received driver data specific to the driving style of the driver.

18. A system for controlling an adaptive lane keeping assist in a moving vehicle, the system comprising:
- one or more sensors configured to detect driver data, the one or more sensors including one or more pressure sensors installed on a steering wheel of the vehicle and configured to detect an applied pressure;
- a neural network controller configured to:
  - receive a first set of data including driver data from the one or more sensors in the vehicle specific to driving styles of a plurality of drivers associated with the vehicle, non-driver data indicative of environment parameters external to the vehicle while the vehicle is moving, and vehicle data associated with the one or more parameters of the vehicle while the vehicle is moving;
  - train, for each driver of the plurality of drivers associated with the vehicle, one or more models of the neural network controller based on the received second set of data;
  - after the one or more models of the neural network controller are trained, receive a second set of data including driver data from the one or more sensors specific to a driving style of a driver of the plurality of drivers and non-driver data indicative of environment parameters external to the vehicle while the vehicle is moving;
  - identify the driver from the plurality of drivers associated with the vehicle based on the driving style of the driver;
  - detect a level of driver engagement based on the applied pressure; and
  - in response to the level of driver engagement being below a threshold, generate a lane assist offset value specific to the identified driver based on the non-driver data and the driver data;
- a lane keeping assist (LKA) controller in communication with the neural network controller, the LKA controller configured to:
  - receive vehicle data associated with one or more parameters of the vehicle while the vehicle is moving, the one or more parameters including a steering angle, a velocity, and a vehicle position between lane markings; and
  - generate a steering angle control signal based on the lane assist offset value and the vehicle data to control steering of the vehicle.

19. The system of claim 18, wherein:
the LKA controller is disabled when the one or more models of the neural network controller are being trained;
the steering angle control signal is a first steering angle control signal; and
the system further comprises a vehicle controller configured to receive a second steering angle control signal from a steering wheel angle sensor and control steering of the vehicle based on the received second steering angle control signal when the one or more models of the neural network controller are being trained.

20. The system of claim 19, wherein the neural network controller is configured to determine an amount of driver interaction with the vehicle based on the received the driver data of the second set of data in the vehicle, and reduce a magnitude of the vehicle data provided to the LKA controller if the amount of driver interaction is above a threshold.

* * * * *